US00RE40883E

(19) United States
(12) Reissued Patent
Pechanek et al.

(10) Patent Number: US RE40,883 E
(45) Date of Reissued Patent: Aug. 25, 2009

(54) METHODS AND APPARATUS FOR DYNAMIC INSTRUCTION CONTROLLED RECONFIGURABLE REGISTER FILE WITH EXTENDED PRECISION

(75) Inventors: Gerald George Pechanek, Cary, NC (US); Edwin Franklin Barry, Vilas, NC (US)

(73) Assignee: Altera Corporation, San Jose, CA (US)

(21) Appl. No.: 10/827,697

(22) Filed: Apr. 19, 2004

Related U.S. Patent Documents

Reissue of:
(64) Patent No.: 6,430,677
Issued: Aug. 6, 2002
Appl. No.: 09/796,037
Filed: Feb. 28, 2001

U.S. Applications:
(62) Division of application No. 09/169,255, filed on Oct. 9, 1998, now Pat. No. 6,343,356.
(60) Provisional application No. 60/092,148, filed on Jul. 9, 1998.

(51) Int. Cl.
*G06F 15/00* (2006.01)

(52) U.S. Cl. ..... 712/210; 711/170; 708/496
(58) Field of Classification Search ..... 712/210, 712/24, 229, 218; 711/173, 170, 129; 708/503, 708/620, 496
See application file for complete search history.

(56) References Cited

U.S. PATENT DOCUMENTS

| | | | | | |
|---|---|---|---|---|---|
| 4,302,818 | A | | 11/1981 | Niemann | 364/736 |
| 4,713,749 | A | * | 12/1987 | Magar et al. | 712/241 |
| 4,774,688 | A | * | 9/1988 | Kobayashi et al. | 708/207 |
| 5,072,418 | A | * | 12/1991 | Boutaud et al. | 708/207 |
| 5,644,780 | A | | 7/1997 | Luick | 395/800 |
| 5,903,919 | A | | 5/1999 | Myers | 711/220 |
| 6,044,448 | A | | 3/2000 | Agrawal et al. | 712/9 |
| 6,078,941 | A | * | 6/2000 | Jiang et al. | 708/625 |
| 6,134,648 | A | | 10/2000 | Peterson et al. | 712/41 |
| 6,223,255 | B1 | * | 4/2001 | Argade | 711/129 |

* cited by examiner

*Primary Examiner*—Henry W. H. Tsai
(74) *Attorney, Agent, or Firm*—Priest & Goldstein, PLLC

(57) ABSTRACT

A reconfigurable register file integrated in an instruction set architecture capable of extended precision operations, and also capable of parallel operation on lower precision data is described. A register file is composed of two separate files with each half containing half as many registers as the original. The halves are designated even or odd by virtue of the register addresses which they contain. Single width and double width operands are optimally supported without increasing the register file size and without increasing the number of register file ports. Separate extended registers are also employed to provide extended precision for operations such as multiply-accumulate operations.

23 Claims, 11 Drawing Sheets

Rt1.w||Rt0.w = Rx1.w*Rx0.w + Rx3.w||Rx2.w

Rt#.2w = Rx1.w*Rx0.w + Rx2.2w

RECONFIGURABLE REGISTER FILE

FIG. 1D1

EXEMPLARY ADD INSTRUCTION FOR USE WITH RECONFIGURABLE REGISTER FILE

ADD-Add

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | ALUopcode / MAUopcode | | | | | | Rt | | | | | Rx | | | | | Ry | | | | | 0 | CE2 | | D PACK | | |
| | | | | | | | | | | | Rte | | | | 0 | Rxe | | | | 0 | Rye | | | | 0 | | | | | | |

Description

The sum of source registers Rx and Ry is stored in target register Rt

FIG. 1D2

Syntax/Operation

| Instruction | Operands | Operation | ACF | |
|---|---|---|---|---|
| | | | Doubleword | |
| ADD.S[AM].1D | Rte, Rxe, Rye | Rto\|\|Rte ← Rxo\|\|Rxe + Ryo\|\|Rye | None | 440 |
| [TF].ADD.S[AM].1D | Rte, Rxe, Rye | Do operation only if T/F condition is satisfied in F0 | None | |
| | | | Word | |
| ADD.S[AM].1W | Rt, Rx, Ry | Rt ← Rx, Ry | None | 430 |
| [TF].ADD.S[AM].1W | Rt, Rx, Ry | Do operation only if T/F condition is satisfied in F0 | None | |
| | | | Dual words | |
| ADD.S[AM].2W | Rte, Rxe, Rye | Rto ← Rxo + Ryo<br>Rte ← Rxe + Rye | None | 441 |
| [TF].ADD.S[AM].2W | Rte, Rxe, Rye | Do operation only if T/F condition is satisfied in F0 | None | |
| | | | Dual Halfwords | |
| ADD.S[AM].2H | Rt, Rx, Ry | Rt.H1 ← Rx.H1 + Ry.H1<br>Rt.H0 ← Rx.H0 + Ry.H0 | None | 431 |
| [TF].ADD.S[AM].2H | Rt, Rx, Ry | Do operation only if T/F condition is satisfied in F0 | None | |
| | | | Quad Halfwords | |
| ADD.S[AM].4H | Rte, Rxe, Rye | Rto.H1 ← Rxo.H1 + Ryo.H1<br>Rto.H0 ← Rxo.H0 + Ryo.H0<br>Rte.H1 ← Rxe.H1 + Rye.H1<br>Rte.H0 ← Rxe.H0 + Rye.H0 | None | 442 |
| [TF].ADD.S[AM].4H | Rte, Rxe, Rye | Do operation only if T/F condition is satisfied in F0 | None | |
| | | | Quad Bytes | |
| ADD.S[AM].4B | Rt, Rx, Ry | Rt.B3 ← Rx.B3 + Ry.B3<br>Rt.B2 ← Rx.B2 + Ry.B2<br>Rt.B1 ← Rx.B1 + Ry.B1<br>Rt.B0 ← Rx.B0 + Ry.B0 | None | 432 |
| [TF].ADD.S[AM].4B | Rt, Rx, Ry | Do operation only if T/F condition is satisfied in F0 | None | |
| | | | Octal Bytes | |
| ADD.S[AM].8B | Rte, Rxe, Rye | Rto.B3 ← Rxo.B3 + Ryo.B3<br>Rto.B2 ← Rxo.B2 + Ryo.B2<br>Rto.B1 ← Rxo.B1 + Ryo.B1<br>Rto.B0 ← Rxo.B0 + Ryo.B0<br>Rte.B3 ← Rxe.B3 + Rye.B3<br>Rte.B2 ← Rxe.B2 + Rye.B2<br>Rte.B1 ← Rxe.B1 + Rye.B1<br>Rte.B0 ← Rxe.B0 + Rye.B0 | None | 443 |
| [TF].ADD.S[AM].8B | Rte, Rxe, Rye | Do operation only if T/F condition is satisfied in F0 | None | |

Arithmetic Scalar Flags Affected (on least significant operation)
N = MSB of result
Z = 1 if result is zero, 0 otherwise
V = 1 if an overflow occurs, 0 otherwise (This bit is meaningful for signed operations)
C = 1 if a carry occurs, 0 otherwise (This bit is meaningful for unsigned operations)

Cycles: 1

TWO x/2 EXTENDED PRECISION REGISTERS

FOUR x/4 EXTENDED PRECISION REGISTERS

FIG. 3C1

MPYXA - Multiply with Extended Accumulate

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | MAUopcode | | | | | | Rte | | | | 0 | Rx | | | | | Ry | | | | | CE3 | | | MPack | | |

FIG. 25A

Discription

The product of source registers Rx and Ry is added to an extended precision target register Rt. The word multiply form of the instruction multiples two 32-bit values producing a 64-bit result which is then added to the 80-bit extended precision target register. The dual halfword form of the instruction multiples two pairs of 16-bit values producing a 32-bit result which is then added to the 40-bit extended precision target register.

The extended precision bits are provided by the Extended Precision Register (XPR). See the diagrams below for the location of the extended bits for the 40-bit and 80-bit results

Syntax/Operation

| Instruction | Operands | Operation | ACF |
|---|---|---|---|
| | | | Word |
| MPYXA.[SP]M.1[SU]W | Rte, Rx, Ry | Do operation below but do not affect ACFs | None |
| MPYXA[CNVZ].[SP]M.1[SU]W | Rte, Rx, Ry | XPR.Hm\|\|Rto\|\|Rte ← XPR.Hm\|\|Rto\|\|Rte + (Rx*Ry) | F0 |
| [TF].MPYXA.[SP]M.1[SU]W | Rte, Rx, Ry | Do operation only if T/F condition is satisfied in ACFs | None |
| MPYXA.SM.1[SU]W | Rte, Rx, Ry | XPR.Hm\|\|Rto\|\|Rte ← XPR.Hm\|\|Rto\|\|Rte + (Rx*Ry) | None |
| [TF].MPYXA.SM.1[SU]W | Rte, Rx, Ry | Do operation only if T/F condition is satisfied in F0 | None |
| | | | Dual Halfwords |
| MPYXA.[SP]M.2[SU]H | Rte, Rx, Ry | Do operation below but do not affect ACFs | None |
| MPYXA[CNVZ].[SP]M.2[SU]H | Rte, Rx, Ry | XPR.Bn1\|\|Rto ← XPR.Bn1\|\|Rto + (Rx.H1 * Ry.H1)<br>XPR.Bn0\|\|Rte ← XPR.Bn0\|\|Rte + (Rx.H0 * Ry.H0) | F1<br>F0 |
| [TF].MPYXA.[SP]M.2[SU]H | Rte, Rx, Ry | Do operation only if T/F condition is satisfied in ACFs | None |
| MPYXA.SM.2[SU]H | Rte, Rx, Ry | XPR.Bn1\|\|Rto ← XPR.Bn1\|\|Rto + (Rx.H1 * Ry.H1)<br>XPR.Bn0\|\|Rte ← XPR.Bn0\|\|Rte + (Rx.H0 * Ry.H0) | None |
| [TF].MPYXA.SM.2[SU]H | Rte, Rx, Ry | Do operation only if T/F condition is satisfied in F0 | None |

701

702

XPR-Extended Precision Register

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| XB3 | | | | | | | | XB2 | | | | | | | | XB1 | | | | | | | | XB0 | | | | | | | |
| XH1 | | | | | | | | | | | | | | | | XH0 | | | | | | | | | | | | | | | |

The XPR register may be used in two ways:

- Sub-registers (XB0 and XB1) or (XB2 and XB3) are used during 40-bit accumulation
- Sub-registers (XH0 and XH1) are used during 80-bit accumulation

FIG. 3C2

The specific sub-registers used in an extended precision operation depend on the size of the accumulation (dual 40-bit or single 80-bit) and on the target CRF register pair specified in the instruction.

Single 80-bit Multiply-Accumulate Extended

During the 80-bit accumulation, the odd-even register pair is extended using either XH0 or XH1 of the XPR depending on the target register. If a target register is designated Rte and a sub-register of XPR is designated XHm, then te and m are related as follows:

m = (te mod 4)/2, for te = (0, 2, 4, ... 30)

Dual 40-bit Multiply-Accumulate Extended

During the dual 40-bit accumulation, the even target register is extended using XB0 or XB2 of the XPR, and the odd target register is extended using XB1 or XB3 of the XPR. If a target register is designated Rte and the sub-registers of XPR are designated XBn0 AND XBn1, then te, n0 and n1 are related as follows:

n0 = te mod 4, for te = (0, 2, 4, ... 30)
n1 = n0 + 1

Arithmetic Scalar Flags Affected (on least significant operation)

N=MSB of result
Z=1 if result is zero, 0 otherwise
V=1 if an overflow occurs on the addition, 0 otherwise
C=1 if a carry occurs on the addition, 0 otherwise Cycles: 1

METHODS AND APPARATUS FOR DYNAMIC INSTRUCTION CONTROLLED RECONFIGURABLE REGISTER FILE WITH EXTENDED PRECISION

Matter enclosed in heavy brackets [ ] appears in the original patent but forms no part of this reissue specification; matter printed in italics indicates the additions made by reissue.

This application is a Div. of Ser. No. 09/169,255 filed Oct. 9, 1998, now U.S. Pat. No. 6,343,356, and claims benefit of Provisional Application No. 60/092,148 filed Jul. 9, 1998.

FIELD OF THE INVENTION

The present invention relates generally to improvements to processing, and more particularly to advantageous techniques for providing a scalable building block register file which in a first application of the register file provides a low cost lower capacity register file, while in a second application, a higher capacity register file with dynamic reconfiguration support for flexible data type operations is provided. The present invention also relates to advantageous techniques for providing a dynamically reconfigurable register file of variable size width for different levels of data precision operations when executing algorithms demanding variable data types of variable precision requirements and for conducting multiple parallel operations on lower precision data in 32 bit and 64 bit forms.

BACKGROUND OF THE INVENTION

When executing algorithms it is desirable to have a register file that can be organized to more advantageously support processing of the varying data types and formats that dynamically occur in a programming application. For example, a register file of large width for high precision operations can be required in one part of an application while single and multiple parallel operations on lower precision data can be required in a different part of the same application. This desire is offset by the hardware cost to implement a wider register file or the hardware cost to implement additional read and write ports. The problem is how to achieve a dynamically configurable register file with extended precision at a reduced hardware cost without affecting general capabilities including performance.

SUMMARY OF THE INVENTION

The present invention advantageously addresses these problems while achieving a variety of advantages as addressed in further detail below. In one aspect of the present invention, to achieve the effect of a doublewide register file, two single wide register files, each with the same number of registers, are used in combination to provide a single register model that uses less read and write ports individually than a single register file of twice the capacity would require. Due to the reduced size of the register files and reduced number of read and write ports, higher performance implementations can be achieved as compared to a single register file of equivalent combined capacity of data width and read and write ports. The architecture designates one reduced register file to contain even register addresses and the other to contain odd register addresses. In a second aspect of this invention, the architecture designates one register file configured as two banks of registers wherein the even and odd registers are selectable by means of the read/write port address lines. In a third aspect of this invention, an additional register set of at least one register can be dynamically associated with any register in the register file to flexibly provide extended precision data width to any selected file register.

By appropriate multiplexing and control logic, single width, double width, and extended precision accessing are made available. By architecture definition, double width accesses are constrained to only work on even-odd register pairs thereby treating the two separate register files as a single addressable file of twice the width of an individual register. By convention and as dictated by the architecture, either the even or odd register file is designated as containing the upper half of the bits in a double width access. Double width accesses may occur on the read, write operations, or both depending on the operation to be performed. In this way, the access width of the register file is doubled without the addition of costly read/write ports or more bits per each register and the number of required read and write ports per half is reduced. The double width register file achieved by this invention provides the single width accesses for a simpler programming model when dealing with data types of single width. Additionally, since the same number of read and write ports exist on both halves, single width accesses across the full even plus odd register address space are possible.

These and other features, aspects and advantages of the invention will be apparent to those skilled in the art from the following detailed description taken together with the accompanying drawings.

BRIEF DESCRIPTION OF THE DRAWINGS

FIGS. 1D1 and 1D2 illustrates an exemplary add instruction for use in conjunction with a reconfigurable register file;

FIG. 2 illustrates a ManArray indirect very long instruction word (iVLIW) processor in conjunction with a reconfigurable register file in accordance with the present invention;

FIGS. 3C1 and 3C2 illustrates an exemplary MPXYA instruction for use with a reconfigurable register file.

DETAILED DESCRIPTION

Further details of a presently preferred ManArray architecture are found in U.S. patent application Ser. No. 08/885,310 now U.S. Pat. No. 6,023,753 and Ser. No. 08/949,122 now U.S. Pat. No. 6,167,502 filed Jun. 30, 1997 and Oct. 10, 1997, respectively, Provisional Application Ser. No. 60/064,619 entitled Methods and Apparatus for Efficient Synchronous MIMD VLIW Communication" filed Nov. 7, 1997, Provisional Application Ser. No. 60/067,511 entitled "Method and Apparatus for Dynamically Modifying Instructions in a Very Long Instruction Word Processor" filed Dec.

4, 1997, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1988, Provisional Application Ser. No. 60/088,148 entitled "Methods and Apparatus for ManArray PE-PE Switch Control" filed on Jun. 5, 1998, Provisional Application Ser. No. 60/092,148 "Methods and Apparatus for Dynamic Instruction Controlled Reconfigurable Register File with Extended Precision" filed Jul. 9, 1998, and Provisional Application Ser. No. 60/092,130 entitled "Methods and Apparatus for Instruction Addressing in Indirect VLIW Processors" filed Jul. 9, 1998, all of which are assigned to the assignee of the present invention and incorporated herein by reference in their entirety.

Figure 1A:
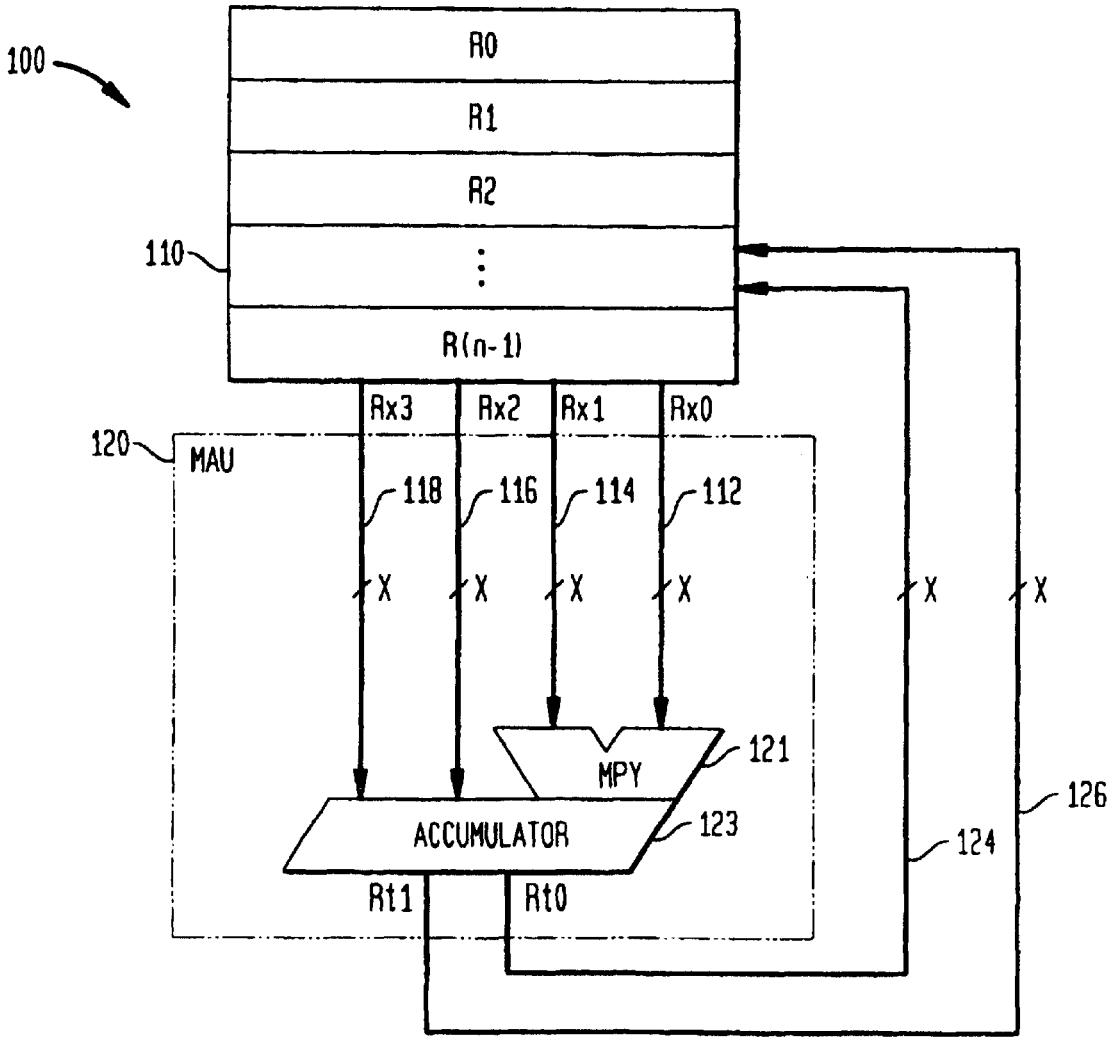
FIG. 1A (PRIOR ART)
FIG. 1A illustrates a first prior art register file arrangement.

FIG. 1A depicts a first prior art register file arrangement 100 (Prior Art) 1 consisting of "n" registers R0 . . . R(n−1) 110 with four read data output ports, Rx0 112, Rx1 114, Rx2 116, and Rx3 118, each of x-bits width. In addition, there are two write ports, Rt0 124 and Rt1 126, each of x-bits.width. A total of six x-bit width ports are required to provide double width accesses. The data bit width "x" is typically 8-bit, 16-bit, 32-bit, 64-bit and other sizes such as 9-bit, 18-bit etc. The register file read data output ports connect to an execution unit, for example a Multiply Accumulate Unit 120 consisting of a multiplier 121 and an accumulator 123. The equation of operation for the MAU 120 shown in FIG. 1A is Rt1.w||Rt0.w=Rx1.w*Rx0.w+Rx3.w||Rx2.w where the notation Ra#.w has a=x for an input source operand and a=t for a target result operand, the # indicative of the register number from the register file 110, and the .w indicates the data type which in this case is a single width x-bit word size. The "||" symbol indicates a concatenation of input or output bus widths due to the granularity of the read and write ports of the register file 110. Other execution unit types include Arithmetic Logic Units, specialized functional units, etc. as dictated by a particular processor architecture.

Figure 1B:
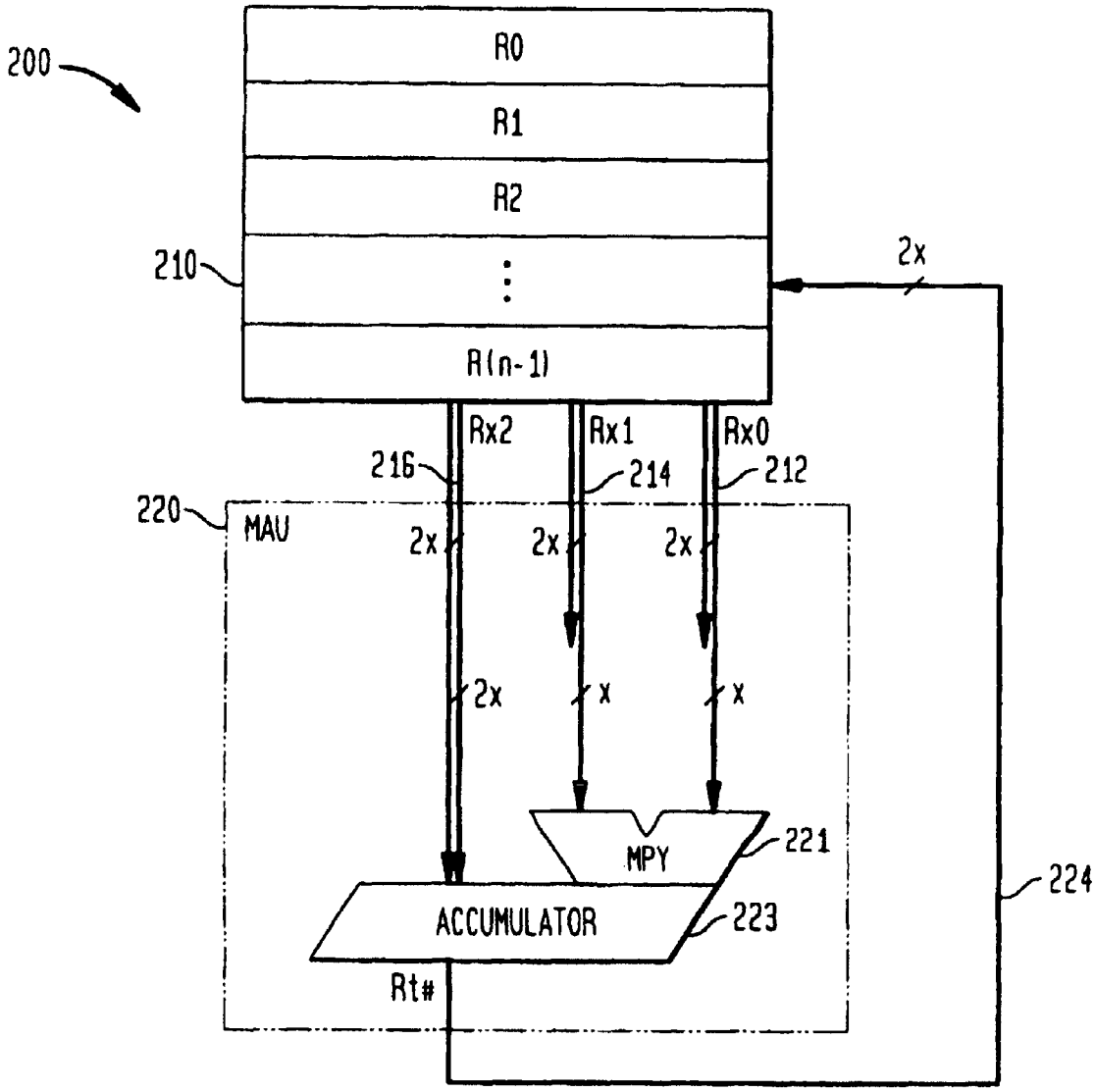
FIG. 1B (PRIOR ART)
FIG. 1B illustrates a second prior art register file arrangement.

FIG. 1B depicts a second prior art register file arrangement 200 (Prior Art 2) consisting of "n" registers R0 . . . R(n−1) 210 with three 2x-bit wide read ports, Rx0 212, Rx1 214, and Rx2 216. In addition, there is a single 2x-bit wide write port Rt 224. A total of three 2x-bit width ports are required to provide double width accesses. The data bit width "2x" is typically 16-bit, 32-bit, 64-bit, 128-bit and other sizes such as 18-bit, 36-bit, etc. The register file read data output ports typically connect to an execution unit, for example a Multiply Accumulate Unit 220 consisting of a multiplier 221 and an accumulator 223. The equation of operation for the MAU 220 shown in FIG. 1B is Rt#.2w=Rx1.w*Rx0.w+Rx2.2w where the notation Rx#.w has a=x for an input source operand and a=t for a target result operand, the # indicative of the register number from the register file 110, the 0.2w indicates the data type which in this case is a double width 2x-bit word size, and the single width ".w" word size uses only half of the read ports Rx0 212 and Rx1 214. In the example indicated, the other halves of the Rx0 and Rx1 data ports are unused. Other execution unit types include Arithmetic Logic Units, specialized functional units, and the like as dictated by a particular processor architecture.

There are problems associated with each of these prior art designs which are solved by the present invention. In the Prior Art 1 approach of FIG. 1A, a large number of read and write single width ports are required to achieve the input data width granularity of operand accesses and 2x-bit result storage requirements of the indicated execution unit. In a VLIW machine supporting multiple execution units, the number of ports grows for each supported execution unit. The number of read and write ports limits the width of the VLIW and affects the performance that can be achieved potentially to an unacceptable level. Increasing the width of the VLIW can be counterproductive, since adding ports to a single "n" register file increases the critical path slowing read and write access.

In FIG. 1B the Prior Art 2 approach, double width ports are used reducing the number of ports but at the expense of granularity of operand accesses and results storage. This means that if a single x-bit width operation is required, the additional x-bits accessed in a 2x-bit read access could be wasted causing a loss of storage, potentially increased power, quite possibly additional programmer overhead to conserve register usage depending upon the whether an execution unit has a single width x-bit write execute action, and potentially slower performance due to programming overhead to conserve register storage space. In addition, if the same number of "n" registers is to be maintained as compared to the Prior Art 1 approach, the "N" registers must be of 2x width doubling the size of the register file which, in general, does not necessarily provide a significant performance advantage that would justify the added expense.

Figure 1C:
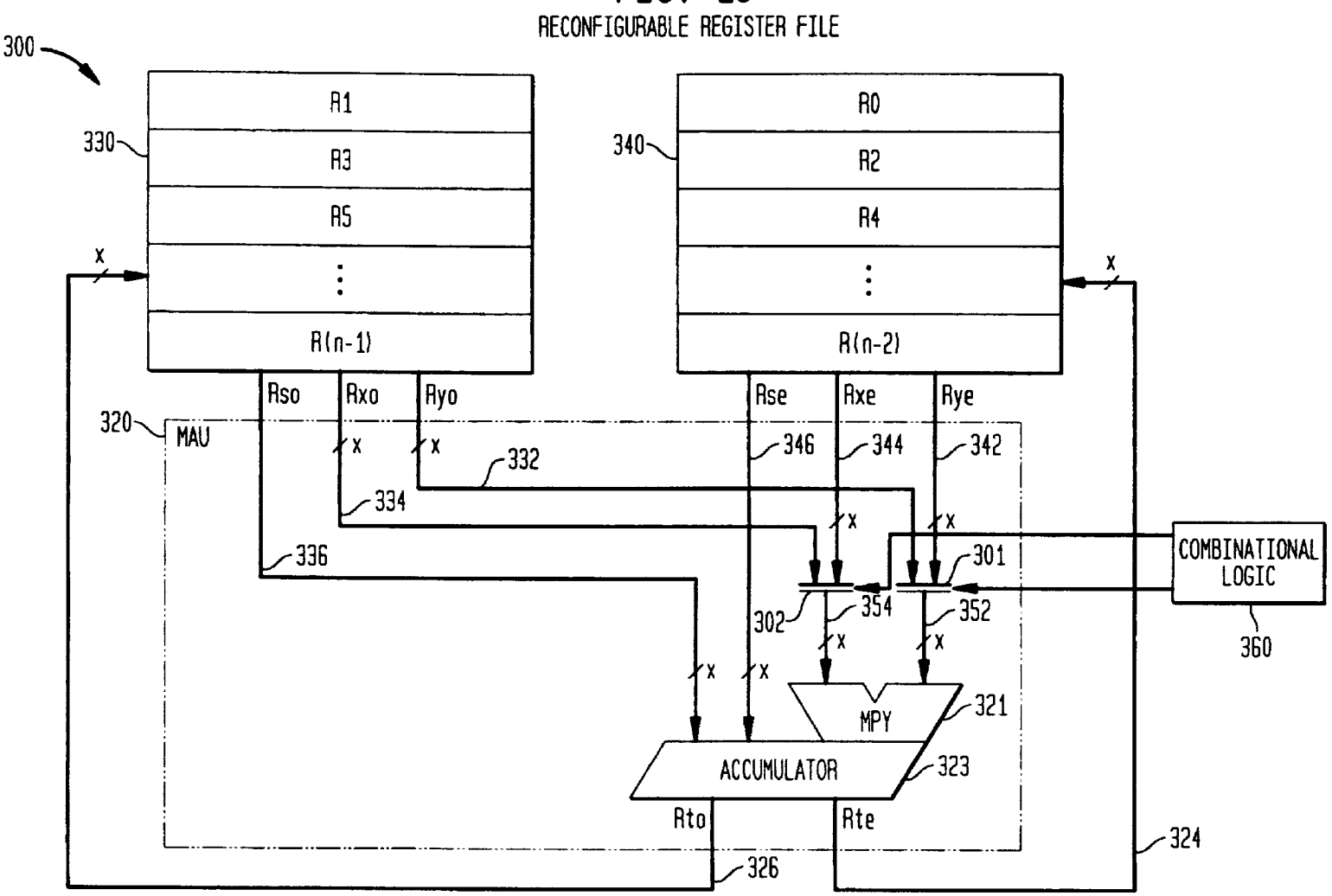
FIG. 1C illustrates a first reconfigurable register file in accordance with the present invention.

FIG. 1C depicts a reconfigurable file and execution unit 300 in accordance with the present invention. The reconfigurable register file consists of a first portion or file 330 and a second portion or file 340, each containing three single x-bit width read access ports, and a single x-bit write port. File 330 consists of read ports Ryo 332, Rxo 334, Rso 336, and write port Rto 326. File 340 consists of read ports Rye 342, Rxe 344, Rse 346 and write port Rte 324. Multiplexers 301 and 302 allow single width accesses 352 and 354, respectively, from either half of the composite register file. The MAU execution unit 320, consists of a multiplier 321 and an accumulator 323. In FIG. 1C each register file portion 330 and 340 is required to have only three x-bit read ports and a single x-bit write port. In the present invention, a small number of ports for each register file portion are utilized to achieve x-bit width granularity of storage. Consequently, this design more readily supports a VLIW architecture containing multiple execution units. In addition, by reducing the register size in each portion of the composite register file of "n/2" registers along with a minimum number of ports, the critical path in the register file is reduced thereby improving its read and write access performance. It is noted that an n/4 register arrangement is also a feasible approach for low cost applications.

In addition, the present invention does not sacrifice granularity of accesses, single width and double width accesses are optimally supported without increasing the register file size. This is important since all applications contain a control portion that typically has sequential execution with little or no parallelism and an algorithm execution portion that typically contains operations that can be executed in parallel. The parallel code portion can be operated upon by packed data operations and VLIW operations while the sequential control section usually requires single width data type operation support. It is consequently of great importance to efficiently support the sequential code data types as well as the parallel code data types. A reconfigurable register file provides this support.

A presently preferred add instruction is shown in FIG. 1D*1* showing support for single x=32 bit width operations 430, 431, and 432 as well as double x=64 bit width operations 440, 441, 442, and 443. With this novel register file design integrated into the instruction set architecture, single width and double width instructions can be mixed on a cycle by cycle basis. For example with x=32-bits, the present invention allows the reconfigurable register file to be treated as a 32x32-bit register file in one cycle and a 16x64-bit register file in the very next cycle.

ManArray Reconfigurable Register File

Figure 2:
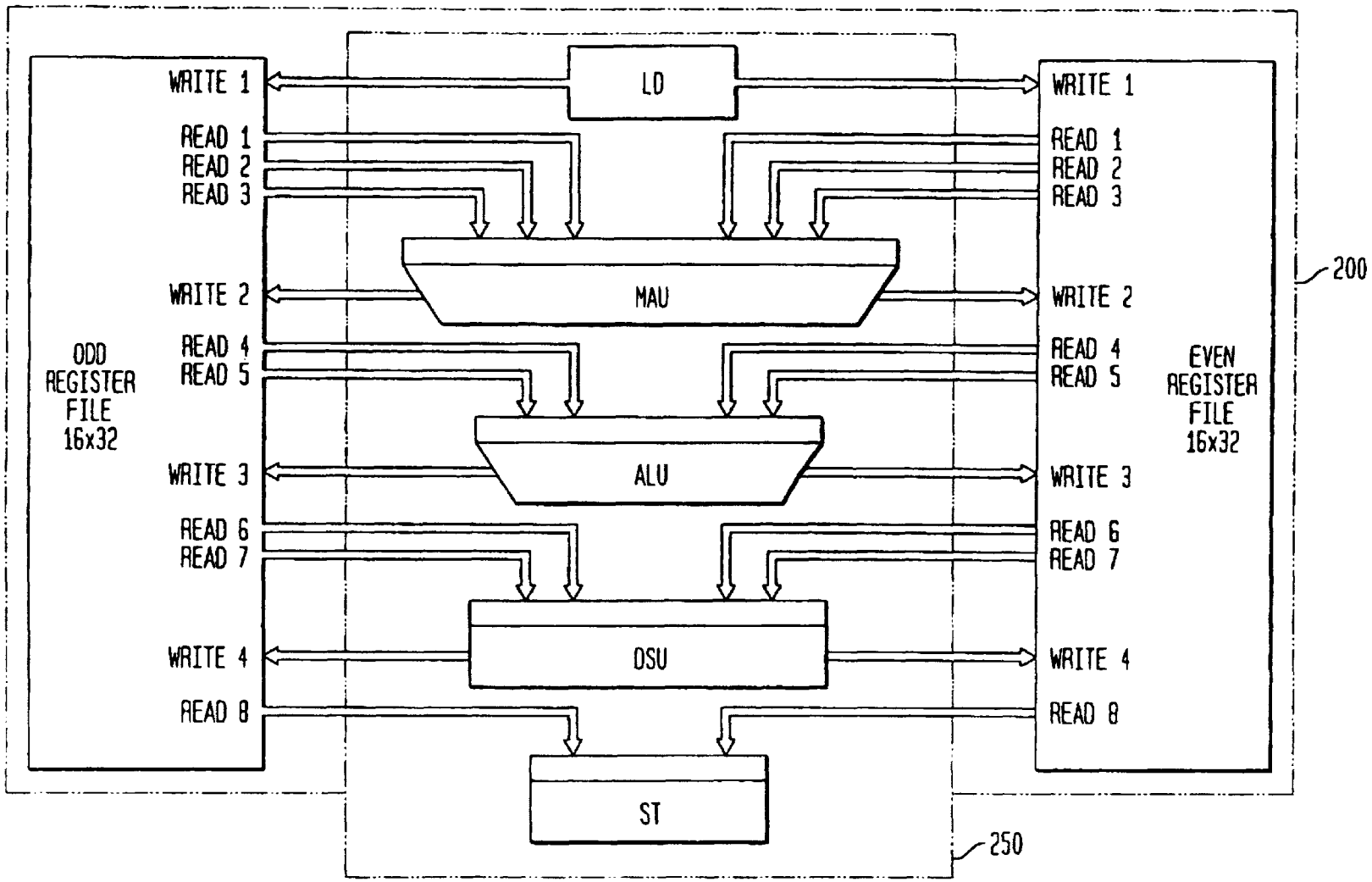

In a ManArray indirect Very Long Instruction Word (iVLIW) processor's execution units 250 as shown in FIG. 2, there are 8 read ports and 4 write ports for each half of the reconfigurable register file 200. These ports support single width 32-bit and in combination double width 64-bit accesses for any of the 5 execution units. Address and control logic are not shown in FIG. 2 to improve the clarity of illustration. It will be recognized that registers having numbers of bits (p), and different numbers of read ports (q) and write ports (r) may be employed.

An exemplary instruction that takes advantage of this configuration of the register file is the 32-bit multiply-accumulate. The operation performed by this instruction is:

$$Rto||Rte \leftarrow (Rx*Ry)+Rto||Rte$$

where Rx and Ry are 32-bit quantities and Rto||Rte is a 64-bit quantity. In a traditional non-split 32-bit wide register file implementation, it would take 1(Rx)+1(Ry)+2(Rto||Rte)=4 32-bit read ports and 2(Rto||Rte←) 32-bit write ports to accommodate this instruction. However, using the two register file blocks described above, this same function can be implemented with 3 read ports and 1 write port per block by using even/odd pairs for the 64-bit quantities.

For operations that do not need 64-bit quantities, the mux on the input to the functional unit is controlled to select the proper register file. As an example, consider the add instruction executing on the ALU that performs the function:

$$Rt \leftarrow Rx+Ry$$

where Rx, Ry, and Rt are 32-bit quantities. If Rx is R1, Ry is R3, and Rt is R5 then the mux on the lower 32-bit inputs selects the odd register file for both inputs. Since the ALU has two read ports on the odd register file this operation is accomplished without any problems. The 32-bit write to R5 is also easily accomplished by only enabling the write for the odd register file. Any combination of even or odd registers can be selected without restrictions.

Extended Precision

An approach to increasing the width of the register file at a reduced hardware cost comes from taking into consideration where the extra precision gained from a wider register file is really needed. For example, in multiply-accumulate operations, extra precision is needed for the accumulation in some applications to increase the number of times accumulation can occur without overflow. In addition, even though providing extended precision support to all register files is a general case, in specific applications this is usually not required and would be considered unnecessarily expensive to implement. It is also not desirable to explicitly specify which registers are specially enabled, to support extended precision operations. Further, it is not desirable to have additional architecturally defined extended precision accumulator registers in addition to an existing register file. Consequently, for low cost implementations, as well as, for a flexible programming model for extended precision support, the present reconfigurable register file with extended precision invention advantageously addresses such concerns.

Figure 3A:
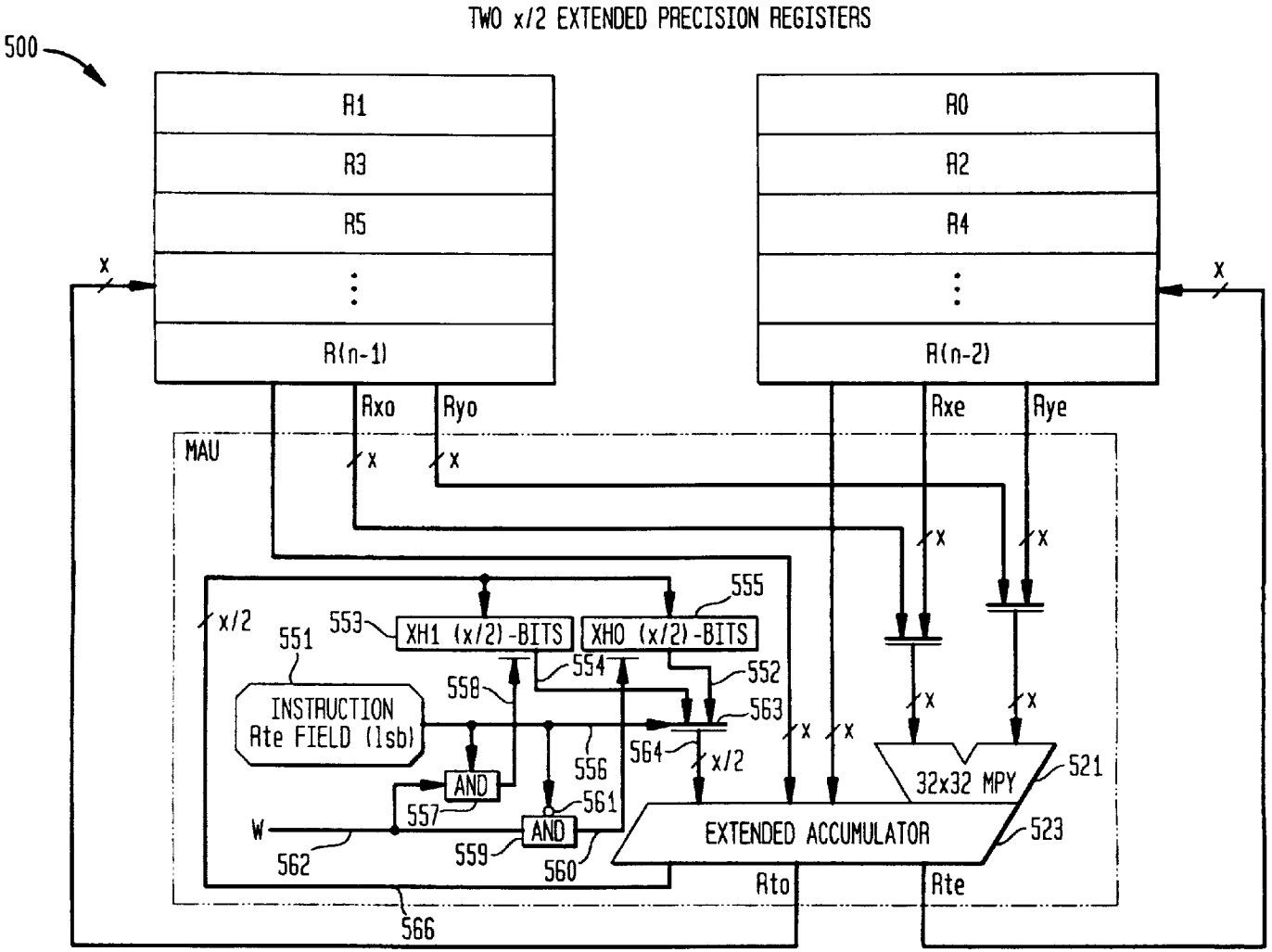
FIG. 3A illustrates two x/2 extended precision registers used with the reconfigurable register file for extended precision.

To accommodate such specific needs without increasing the number of ports or the width of the entire register file, the reconfigurable register file concept is extended by adding, in the simplest case, a single additional register known as the extended precision register. FIG. 3A illustrates a system 500 employing two (x/2)-bit registers 553 and 555 labeled XH1 and XH0 which are used to extend the precision of the accumulation operation that occurs in the Extended accumulator unit 523. The Multiply with Extended Accumulate operation is defined in [FIG. 3C] *FIGS. 3C1 and 3C2* which defines the MPYXA instruction. The apparatus of FIG. 3A is adapted for an 80-bit extended accumulate operation where a 32×32-bit multiply is carried out by multiplier 521 which produces a 64-bit result that is extended to 80-bits in the accumulate operation of extended accumulator 523. This can be seen in FIG. 3A where depending upon the least significant bit (LSB) of the target register field in the MPYXA instruction, bit 17 of FIG. [3C]*3C1*, one of two extended precision registers XH1 553 or XH0 555 is selected via multiplexer 563. The least significant bit of the Register Target field allows the extended precision register to be arbitrarily used with any pair of registers in the register file. This powerful but simple feature allows a programmer to utilize any pair of registers for an extended precision operation without any mode control or specialized accumulator hardware added to the architecture. The inputs of multiplexer 563 are the (x/2)-bit length extended precision input operands XH0 552 and XH1 554. The multiplexer 563 selects XH0 552 when its input control line 556 is a "0". The multiplexer 563 selects XH1 554 when its input control line 556 is a "1". The output of multiplexer 563 is signal line 564 which is (x/2)-bits and is an input to the extended accumulator 523. The extended output 566 is a partial sum of product value that is stored in the extended precision registers in preparation for the next multiply accumulate operation. The output 566 is written to either XH1 553 or XH0 555 under control of a Write (Wr) signal 562. The pipeline stored LSB of the Rte field 551 is used to control the Wr signal via logical AND type function where the Wr 562 is passed onto the register depending on the state of the LSB. The AND gates 557 and 559 control this function, where the LSB input to AND 559 is an inverted version 561 of whatever bit appears on line 556. The output of the AND gates 558 and 560 control the writing of the output extended precision data 566 to their extended precision registers. The extended precision registers XH1 553 and XH0 555 are part of the special purpose or miscellaneous registers that are used in the processor and consequently are load-able and read-able by the programmer. The read and write buses that accomplish this task for the programmer are not shown in FIG. 3A for reasons of clarity.

Figure 3B:
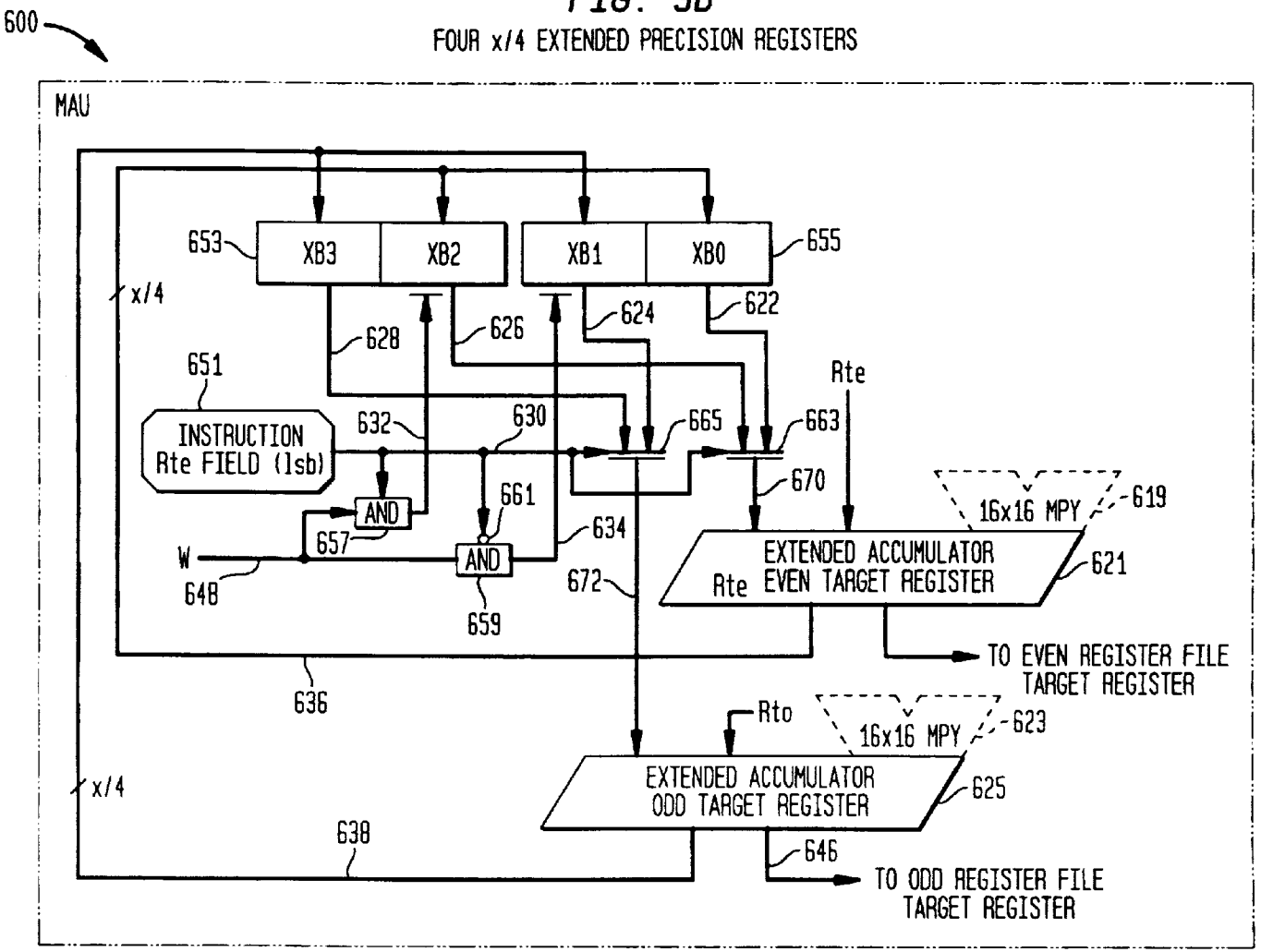
FIG. 3B illustrates four x/4 extended precision registers used with the reconfigurable register file for extended precision.

FIG. 3B depicts a quad extended precision apparatus 600 supporting the MPYXA multiply with extended accumulate instruction of FIG. [3C]*3C1* which shows dual 40 bit accumulation 702 and double width 80 bit accumulation [703] *701*. In FIG. 3B, four (x/4)-bit registers are provided as partitions of two (x/2)-bit registers 653 and 655 labeled XB3 and XB2 in register 653 and XB1 and XB0 in register 655. The four (x/4)-bit registers are used to extend the precision of the accumulation operation that occurs in the Extended accumulator units 621 and 625. The Multiply with Extended Accumulate operation is defined in FIG. [3C]*3C1* which defines the MPYXA instruction for dual 40-bit extended accumulates 702. The apparatus of FIG. 3B supports the dual 40-bit extended accumulate operation where two 16×16-bit multiplies 619 and 623 each produce a 32-bit result that are each extended to 40-bits in the accumulate operations performed by accumulators 621 and 625, respectively. This operation can be seen in FIG. 3B where depending upon the least significant bit (LSB) of the target register field in the MPYXA instruction, bit 17 of FIG. [3C]*3C1*, one of two extended precision registers XB3 and XB2 653 or XB1 and XB0 655 are selected via multiplexers 663 and 665. The least significant bit of the Register Target field allows the extended precision register to be arbitrarily used with any pair of registers in the register file. This powerful but simple feature allows a programmer to utilize any pair of registers for an extended precision operation without any mode control or specialized accumulator hardware added to the architecture. The input of multiplexers 663 and 665 are the (x/[2]*4*)-bit length extended precision input operands XB0 622 and XB2 626 for multiplexer 663, and XB1 624 and XB3 628 for multiplexer 665. The multiplexer 663 selects XB0 622 when its input control line 630 is a "0". The multiplexer 665 selects XB1 624 when its input control line 630 is a "0". The multiplexer 663 selects XB2 626 when its input control line 630 is a "1". The multiplexer 665 selects XB3 628 when its input control line 630 is a "1". The output 670 of multiplexer 663 is (x/4)-bits and serves an input to the extended accumulator 621. The extended output 636 is a partial sum of product value that is stored in the extended precision registers in preparation for the next multiply accumulate operation. The output 672 of multiplexer 665 is (x/4)-bits and serves as an input to the extended accumulator 625. The extended output 638 is a partial sum of product value that is stored in the extended precision registers in preparation for the next multiply accumulate operation. The output 636 is written to either XB2 or XB0 and the output 638 is written to either XB3 or XB1 all under control of a Write (Wr) signal 648. The pipeline stored LSB of the Rte field 651 is used to control the Wr signal via a logical AND type function where the Wr 648 is passed onto the register depending on the state of the LSB. The AND gates 657 and 659 control this function, where the LSB input to AND 659 is an inverted 661 version of 630. The output of the AND gates 632 and 634 control the writing of the output extended precision data 636 and 638 to their extended precision registers. The partitioned extended precision registers 653 and 655 are part of the special purpose or miscellaneous registers that are used in the processor and consequently are load-able and read-able by the programmer. The read and write buses that accomplish this task for the programmer are not shown in FIG. 3B for reasons of clarity.

In a typical application, x is 32-bits, with (x/2)=16-bits and (x/4)=8-bits though different extended precision bit widths are not precluded. The present approach allows dual accumulations of 40-bits of precision for dual 16×16 multiply-accumulates, as specified in the MPYXA instruction FIG. 3C and for the exemplary apparatus shown in FIG. 3B. For 32×32 multiply-accumulate operations, 80-bits of precision are available for the accumulation. The extended precision concept can be further extended to support quad 20 bit accumulations where x is 16-bits and there are 4 extended precision bits. The concept can be further generalized by using more than one x-bit extended precision register and basing the selection of the register extended precision portions on more than the single LSB of the Instruction Rte field. Since a single 32-bit extended precision register provides support for up to two 80-bit extended accumulate operations and up to four 40-bit extended accumulate operations, further extensions, even though feasible, for practical reasons presently appear to be of limited use.

Figure 4:
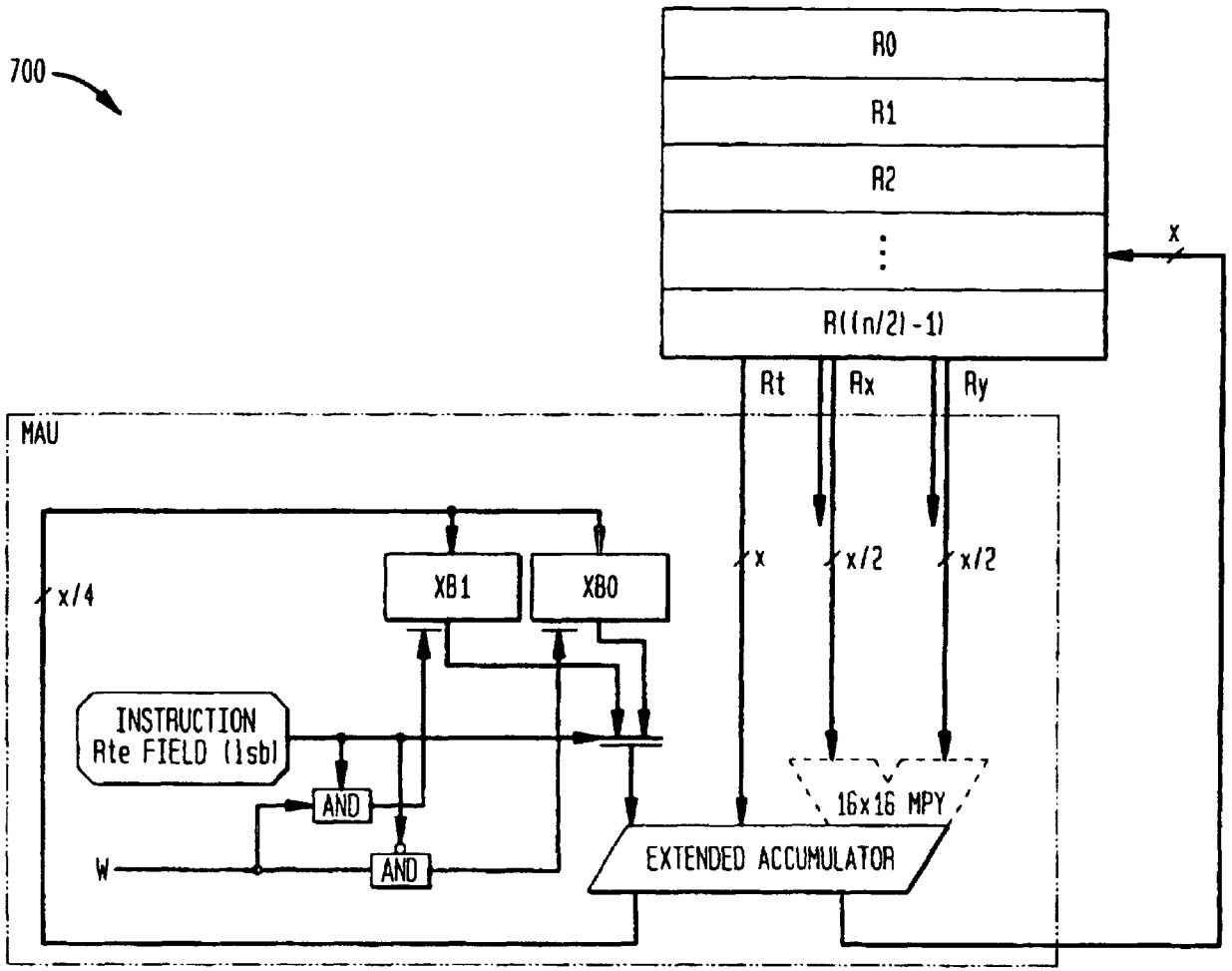
FIG. 4 illustrates two x/4 extended [prevision] *precision* registers used with a building block register file that is a subset of the reconfigurable register file.

Due to the nature of many applications, a processor can be designed utilizing a subset of the ManArray architecture that is based upon a single 16×32 register file, i.e. one of the building blocks for a reconfigurable register file. Dual 8×32 register files can be also used to create a reconfigurable 16×32 register file. An important aspect is that a low cost register file design point can be reached by subsetting the ManArray architecture that allows future growth into higher performance processors that remain code compatible with the lower cost subset design. An exemplary apparatus 700 implementing this use of the extended precision concept with a single register file design is shown in FIG. 4.

While the present invention has been described in the context of a number of presently preferred embodiments, it will be recognized that the teachings of the present invention may be advantageously applied to a variety of processing arrays and variously adopted consistent with the claims which follow.

We claim:

1. A processing apparatus for performing a multiply accumulate operation comprising:

a reconfigurable register file including an odd register file portion and an even register file portion;

a first multiplexer to select the odd register file portion or the even register file portion to provide a first value;

a second multiplexer to select the odd register file portion or the even register file portion to provide a second value;

a multiplier for performing a multiply operation on the first value and the second value to produce a third value; and an accumulator for accumulating the third value with a fourth value to produce a result value, wherein the fourth value comprises a concatenated even and odd pair of values read from the reconfigurable register file.

2. The processing apparatus of claim 1 wherein the accumulator is further for writing the result value to the reconfigurable register file.

3. The processing apparatus of claim 1 wherein the accumulator is further for writing the result value to the reconfigurable register file as an even and odd pair.

4. The processing apparatus of claim 1 wherein the first multiplexer allows for single width accesses to the odd register file portion or the even register file portion.

5. The processing apparatus of claim 4 wherein the second multiplexer allows for single width accesses to the odd register file portion or the even register file portion.

6. A processing apparatus for performing an extended precision multiply accumulate operation comprising:

a reconfigurable register file including an odd register file portion and an even register file portion;

a first multiplexer to select the odd register file portion or the [second] *even* register file portion to provide a first value;

a second multiplexer to select the odd register file portion or the [second] *even* register file portion to provide a second value;

an extended precision register containing an extended value;

a multiplier for performing a multiply operation on the first value and the second value to produce a third value; *and* an extended accumulator for accumulating the third value with the extended value concatenated with a fourth value to produce a result value, wherein the fourth value comprises an even and odd pair read from the reconfigurable register file.

7. The processing apparatus of claim 6 wherein the accumulator is further for writing a first portion of the result value to the reconfigurable register file and a second portion of the result value to the extended precision register.

8. The processing apparatus of claim 6 wherein the accumulator is further for writing a first portion of the result value to the reconfigurable register file as an even and odd pair, and writing a second portion of the result value to the extended precision register.

9. A processing method for a processing apparatus comprising a reconfigurable register file including an odd register file portion and an even register file portion comprising the steps of:

selecting the odd register file portion or the even register file portion to provide a first value;

selecting the odd register file portion or the even register file portion to provide a second value;

multiplying the first value and the second value to produce a third value;

reading a fourth and a fifth value from the reconfigurable register file;

concatenating the fourth value with the fifth value to produce a concatenated value;

accumulating the third value with the concatenated value to produce a final result value.

10. The method of claim 9 wherein the third value and the fourth value comprise an even and odd pair read from the reconfigurable register file.

11. The method of claim 9 further comprising the step of:

storing the final result value to the reconfigurable register file.

12. The method of claim 11 wherein the final result includes an odd portion stored in the odd register file portion and an even portion stored in the even file portion.

13. A processing method for a processing apparatus comprising a reconfigurable register file including an odd register file portion and an even register file portion comprising the steps of:

selecting the odd register file portion or the even register file portion to provide a first value;

selecting the odd register file portion or the even register file portion to provide a second value;

multiplying the first value and the second value to produce a third value;

reading a fourth and a fifth value from the reconfigurable register file;

concatenating an extended value[,] *and* the fourth value with the fifth value to produce a concatenated value; and accumulating the third value with the concatenated value to produce a final result value.

14. The processing method of claim 13 further comprising the, before the step of concatenating, the step of:

reading the extended value from an extended precision register.

15. The method of claim 13 further comprising the step of:

storing a portion of the final result value to the reconfigurable register file.

16. The method of claim 13 further comprising the step of:

storing a portion of the final result value to an extended precision register.

*17. An apparatus for performing an operation with extended precision, the apparatus comprising:*

*at least two extended precision registers containing an extended value;*

*a register file containing a plurality of registers, the register file having at least two read ports;*

*an execution unit reading a first and a second value through the at least two read ports and connecting said execution unit's output to the at least two extended precision registers;*

*a multiplexer, in response to a portion of a field in an instruction, selecting one of the at least two extended precision registers to provide a third value to the execution unit, said field in the instruction specifying one of at the least two extended precision registers to be written by the execution unit when the execution unit executes the instruction utilizing the first value, second value, and third value as inputs thereby increasing the precision of the operation.*

*18. The apparatus of claim 17 wherein the at least two extended precision registers having a first and second precision register, wherein the instruction further controlling whether to write the output of the execution unit to either the first or second precision register.*

*19. The apparatus of claim 17 wherein the at least two extended precision registers are loadable and readable by an application program.*

*20. The apparatus of claim 17 wherein the selection of one of the at least two extended precision registers as additional input to the execution unit is determined by a bit carried in the instruction.*

*21. The apparatus of claim 17 further comprising combinational logic receiving a bit from the instruction as input to determine whether to write output from the execution unit to the at least two extended precision registers.*

*22. The apparatus of claim 17 wherein the execution unit reads single width data types when reading the at least two read ports.*

*23. The apparatus of claim 17 wherein the execution unit reads double width data types when reading the at least two read ports.*

* * * * *